(12) United States Patent
Bain et al.

(10) Patent No.: US 9,827,688 B2
(45) Date of Patent: Nov. 28, 2017

(54) PATCH FABRICATION SYSTEM

(71) Applicant: The Boeing Company, Chicago, IL (US)

(72) Inventors: David Michael Bain, Ashburton (AU); Martin Alexander Szarski, Canterbury (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/993,283

(22) Filed: Jan. 12, 2016

(65) Prior Publication Data
US 2017/0197324 A1 Jul. 13, 2017

(51) Int. Cl.
G06K 9/00 (2006.01)
B26D 5/00 (2006.01)
G06T 7/00 (2017.01)

(52) U.S. Cl.
CPC .............. *B26D 5/007* (2013.01); *B26D 5/005* (2013.01); *G06T 7/0006* (2013.01); *G06T 7/0044* (2013.01); *G06T 7/0083* (2013.01); *G06T 2207/30108* (2013.01)

(58) Field of Classification Search
CPC ...... B26D 5/007; B26D 5/005; G06T 7/0006; G06T 7/0044; G06T 7/0083; G06T 2207/30108
See application file for complete search history.

(56) References Cited

U.S. PATENT DOCUMENTS

| 8,524,356 | B1 * | 9/2013 | Dan-Jumbo | B29C 73/10 156/94 |
| 2005/0047643 | A1 * | 3/2005 | Lowe | G01N 21/8851 382/141 |
| 2007/0106418 | A1 * | 5/2007 | Hagen | B29C 70/386 700/186 |
| 2010/0314029 | A1 * | 12/2010 | Lindgren | B23Q 17/20 156/98 |
| 2013/0307174 | A1 * | 11/2013 | Lindgren | B23Q 17/20 264/40.1 |
| 2015/0086745 | A1 * | 3/2015 | Griess | B29C 73/10 428/63 |

OTHER PUBLICATIONS

"AccuScan Pattern Digitizing Software," Gerber Scientific, Inc., copyright 2015, 2 pages, accessed Nov. 2, 2015. http://trans.gerbertechnology.com/default.aspx?aspxerrorpath=/en%C2%ADus/solutions/apparelretail/plottingdigitizing/accuscanpatterndigitizing.aspx.

(Continued)

*Primary Examiner* — Amara Abdi
(74) *Attorney, Agent, or Firm* — Yee & Associates, P.C.

(57) ABSTRACT

A method and apparatus for managing a rework of a composite structure. Boundary geometries are identified for the layer boundaries in an image of a rework area. The image includes layer boundaries for exposed layers in the rework area. Layer orientations are identified for the exposed layers. A description of a patch for installation in the rework area is generated using the boundary geometries and layer orientations. The patch has plies having ply boundaries with the boundary geometries corresponding to the layer boundaries and ply orientations corresponding to the layer orientations. An operation of a ply cutting system is controlled using the group of files describing the patch, enabling fabricating the patch for the rework area using the group of files describing the patch.

27 Claims, 13 Drawing Sheets

(56) References Cited

OTHER PUBLICATIONS

"Pattern Digitizing," Autometrix Precision Cutting Systems, Inc., copyright 2015, 2 pages, accessed Nov. 2, 2015. http://www.autometrix.com/solutions/patterndigitizing/.

"Production Facility," Vermont Composites, Inc., copyright 2015, 4 pages, accessed Nov. 2, 2015. http://www.vtcomposites.com/Production_Facility.aspx?Print=1.

* cited by examiner

PATCH FABRICATION SYSTEM

BACKGROUND INFORMATION

1. Field

The present disclosure relates generally to composite structures and, in particular, to a method and apparatus for reworking an area on a composite structure. Still more particularly, the present disclosure relates to a method and apparatus for fabricating a patch in a rework area on a composite structure.

2. Background

Aircraft are being designed and manufactured with greater and greater percentages of composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials that are created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

In manufacturing composite structures, layers of composite material are typically laid up on a tool. The layers may be comprised of fibers in sheets. These sheets may take the form of fabrics, tape, tows, or other suitable forms. In some cases, resin may be infused or pre-impregnated into the sheets. These types of sheets are commonly referred to as prepreg.

The different layers of prepreg may be laid up in different orientations, and different numbers of layers may be used, depending on the thickness of the composite structure being manufactured. These layers may be laid up by hand or by using automated lamination equipment, such as a tape laminating machine or a fiber placement system.

After the different layers of composite material have been laid up on the tool, the layers of composite material may be consolidated and cured upon exposure to temperature and pressure, thus forming the final composite structure. Thereafter, the composite structure may be inspected to determine whether inconsistencies are present. The inspection may be performed using x-ray inspection systems, ultrasound inspection systems, and other types of non-destructive inspection systems.

If an inconsistency is identified, the composite structure may be reworked. In some cases, the inconsistency may result in the composite structure being discarded, thus requiring a new composite structure to be manufactured. Examples of inconsistencies that may be present in a composite structure include voids, porosity, delamination, foreign object debris (FOD), and other types of inconsistencies.

In reworking a composite structure with an inconsistency, layers of composite material are removed from an area in which the inconsistency is located. The layers may be removed until the inconsistency is also removed from the composite structure. The removal of the layers of composite material results in a scarf in which the layers of composite material are exposed.

A patch is fabricated to fill the scarf in performing the rework. The patch includes plies of composite material. These plies have sizes that match the layers removed from the composite structure. Further, the plies for the patch also have the same orientations as the layers of composite material removed from the composite structure.

In fabricating a patch, a transparent sheet of material is placed over the rework area in which the layers of composite material have been removed. Layer boundaries are present for the exposed layers in the rework area. These layer boundaries are traced onto the transparent sheet to form a transparency. Additionally, the orientation of the exposed layers may be marked on the transparency. This transparency containing the layer boundaries and other markings is a master transparency.

Thereafter, a new transparent material is placed over the master transparency. One of the layer boundaries is traced onto a new sheet of transparent material to form a transparency for an individual ply that is to be formed. In this manner, transparencies are created for each of the plies that are to be cut from a composite material for a patch.

If multiple patches are needed, additional sets of transparencies are made from the master transparency. Additional patches may be fabricated to perform testing prior to the actual installation of the patch into the rework area. For example, a thermal survey may be performed with one copy of the patches prior to the installation of another copy of the patches in the rework area.

Thereafter, each of the transparencies is overlaid onto a layer of material. This layer of material is a layer of composite material, such as a carbon fiber fabric. The transparencies are overlaid onto the layer of material with a desired orientation. Thereafter, plies are cut out from the transparencies and overlaid onto the material. These plies may then be placed into a stack to form the patch.

These different steps are currently performed by a human operator. As a result, transparencies that are created from the master transparency may not all have the same measurements as the master transparency because of errors in tracing. Additionally, having a human operator cut the layer of material also may result in a ply that does not match the transparency as closely as desired.

These copying and cutting errors may result in a patch that does not properly fit the rework area. As a result, the process may be repeated again, the composite structure may be discarded, or some other operation may be needed to perform a rework of the composite structure.

As a result, this type of process may be more time-consuming and expensive than desired when a patch cannot be used, and the process is performed again to fabricate a new patch. Therefore, it would be desirable to have a method and apparatus that take into account at least some of the issues discussed above, as well as other possible issues. For example, it would be desirable to have a method and apparatus that overcome a technical problem with fabricating patches in a manner that reduces copying and cutting errors.

SUMMARY

An embodiment of the present disclosure provides a method for managing a rework of a composite structure. The method comprises identifying a group of boundary geometries for a group of layer boundaries for a group of exposed layers in a rework area using an image of the rework area for the composite structure, wherein the image includes the group of layer boundaries for the group of exposed layers in the rework area of the composite structure. Further, the method comprises identifying a group of layer orientations for the group of exposed layers in the rework area of the composite structure. Yet further, the method comprises generating a description of a patch for installation in the rework area using the group of boundary geometries and the group of layer orientations, wherein the patch has a group of plies having a group of ply boundaries with the group of boundary geometries corresponding to the group of layer boundaries and a group of ply orientations corresponding to the group of layer orientations. Still yet further, the method comprises controlling an operation of a ply cutting system using the description of the patch having the group of plies having the group of ply boundaries with the group of boundary geometries corresponding to the group of layer boundaries and the group of ply orientations corresponding to the group of layer orientations, enabling fabricating the patch for the rework area using the description of the patch.

Another embodiment of the present disclosure provides an apparatus. The apparatus comprises a rework manager that identifies a group of boundary geometries for a group of layer boundaries for a group of exposed layers in a rework area using an image of the rework area for the composite structure, wherein the image includes the group of layer boundaries for the group of exposed layers in the rework area of the composite structure. Further, the rework manager identifies a group of layer orientations for the group of exposed layers in the rework area. Yet further, the rework manager generates a description of a patch for installation in the rework area using the group of boundary geometries and the group of layer orientations, wherein the patch has a group of plies having a group of ply boundaries with the group of boundary geometries corresponding to the group of layer boundaries and a group of ply orientations corresponding to the group of layer orientations. Still further, the rework manager controls an operation of a ply cutting system using the description of the patch having the group of plies having the group of ply boundaries with the group of boundary geometries corresponding to the group of layer boundaries and the group of ply orientations corresponding to the group of layer orientations, enabling fabricating the patch for the rework area using the description of the patch.

Yet another embodiment of the present disclosure provides a patch fabrication system. The patch fabrication system comprises a camera system, a ply cutting system, and a control system. The control system controls the camera system to generate an image from a transparency of a rework area of a composite structure, wherein the transparency includes layer boundaries of exposed layers in the rework area of the composite structure and indications of layer orientations of the exposed layers. Further, the control system identifies plies from the layer boundaries for the exposed layers in the image. Yet further, the control system identifies ply orientations for the plies from the indications of the layer orientations for the exposed layers in the image. Still further, the control system generates a group of files describing ply boundaries and the ply orientations. Still yet further, the control system controls an operation of the ply cutting system using an identification of the ply boundaries and the ply orientations in the group of files, wherein a patch for the rework area is fabricated using the group of files describing ply boundaries and the ply orientations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that eliminating the copying of a transparency onto a new transparency may reduce copying errors. Further, the illustrative embodiments also recognize and take into account that eliminating the step in which the transparencies are placed onto the material and used to cut the material also may reduce cutting errors.

The illustrative embodiments provide a method and apparatus for fabricating a patch for a composite structure. The illustrative embodiments recognize and take into account that an image may be made from the transparency, or by acquiring a digital image of the rework area on the composite structure directly, and that the image may be processed to identify the boundaries for the exposed layers. These boundaries may be used to identify the boundary geometries for the plies with the boundary geometries being used to control a cutting system that cuts layers of material to form the plies.

In one example, a method is present for managing a rework of a composite structure. An image of a rework area for a composite structure is generated. The image includes a group of layer boundaries for a group of exposed layers in the rework area of the composite structure.

A group of boundary geometries for the group of layer boundaries for a group of exposed layers in the image is identified. A group of layer orientations for the group of exposed layers in the rework area is identified. A group of files describing a patch for installation in the rework area is generated using the group of boundary geometries for the group of layer boundaries and the group of layer orientations. The patch has a group of plies having a group of ply boundaries with the group of boundary geometries corresponding to the group of layer boundaries and a group of ply orientations corresponding to the group layer orientations. An operation of a ply cutting system is controlled using the group of files describing the patch having the group of plies having the group of ply boundaries with the group of boundary geometries corresponding to the group of layer boundaries and the group of ply orientations corresponding to the group of layer orientations, enabling fabricating the patch for the rework area using the group of files describing the patch.

As used herein, "a group of", when used with reference items, means one or more items. For example, "a group of layer boundaries" is one or more layer boundaries.

Figure 1:
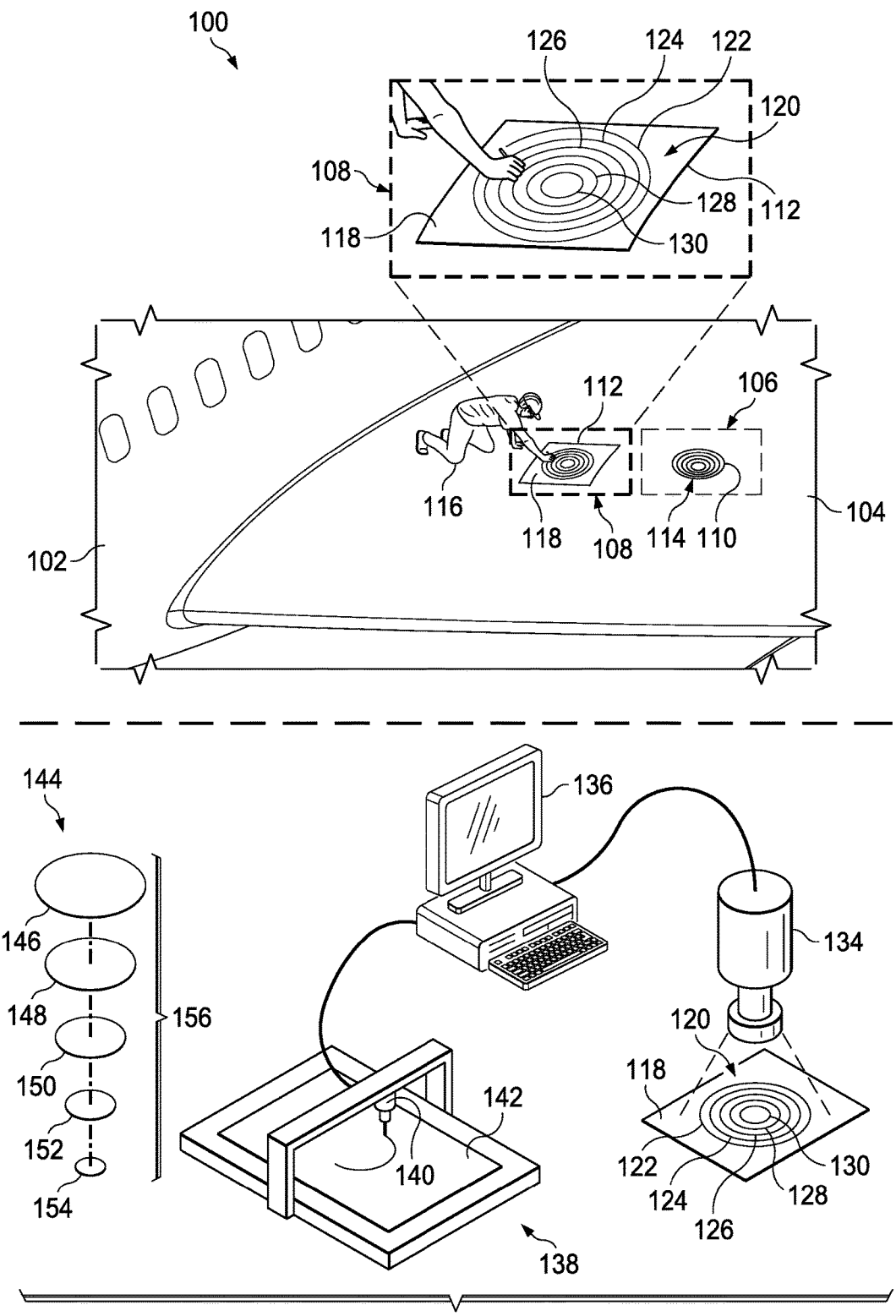
FIG. 1 is a pictorial illustration of a rework environment in accordance with an illustrative embodiment.

With reference to the figures and, in particular, with reference to FIG. 1, a pictorial illustration of a rework environment is depicted in accordance with an illustrative embodiment. In this illustrative example, rework environment 100 includes aircraft 102. Wing 104 for aircraft 102 is a composite structure on which a rework may be performed.

As depicted, rework area 106 and rework area 108 are present on wing 104. In this illustrative example, scarf 110 has been formed in rework area 106, and scarf 112 has been formed in rework area 108. Scarf 110 and scarf 112 have been formed as a result of removing inconsistencies in rework area 106 and rework area 108, respectively.

In rework area 106, scarf 110 has exposed layers 114. Exposed layers 114 are a result of removing a group of layers of composite material to remove inconsistencies in rework area 106. In a similar fashion, scarf 112 also has exposed layers (not shown) formed from removing one or more layers of composite material to remove inconsistencies in rework area 108.

In this illustrative example, human operator 116 is located at scarf 112 and creates transparency 118 for scarf 112 in rework area 108. As depicted, in this example, transparency 118 has boundaries 120 for exposed layers (not shown) in scarf 112. Boundaries 120 are markings on transparency 118 created by human operator 116 tracing layer boundaries (not shown) for scarf 112.

In particular, boundaries 120 include boundary 122, boundary 124, boundary 126, boundary 128, and boundary 130, as seen in rework area 108. In this illustrative example, boundary 122 is the outermost boundary, and boundary 130 is the innermost boundary. Boundary 122, the outer most boundary, is the boundary for the first layer removed in rework area 108, and boundary 130, the innermost boundary, is the boundary for the last layer removed in rework area 108.

Also shown in FIG. 1 are camera system 134, computer 136, and ply cutting system 138. In this illustrative example, camera system 134 creates an image of boundaries 120 as shown traced on transparency 118. Optionally, camera system 134 may be utilized to acquire a digital image of rework area 108 on the composite structure directly rather than manually outlining rework area 108 using transparency 118. This generation of the digital image may be referred to as a direct capture in contrast to generating the digital image from transparency 118. As depicted, camera system 134 is a visible light camera system.

The image is processed by computer 136. Computer 136 identifies boundaries 120. In particular, computer 136 identifies boundary geometries for boundaries 120.

Based on the identification of boundaries 120 in the image, computer 136 controls the operation of ply cutting system 138. In this illustrative example, ply cutting system 138 includes laser 140 that cuts layer of composite material 142 under the control of computer 136. As depicted, layer of composite material 142 is a carbon fiber fabric that may be dry or prepreg.

The cutting of layer of composite material 142 forms plies 144. As depicted, plies 144 include ply 146, ply 148, ply 150, ply 152, and ply 154. In this illustrative example, ply 146 corresponds to boundary 122; ply 148 corresponds to boundary 124; ply 150 corresponds to boundary 126; ply 152 corresponds to boundary 128; and ply 154 corresponds to boundary 130. As depicted, plies 144 are arranged in a stack to form patch 156. Patch 156 may then be installed on scarf 112 in rework area 108.

The illustration of rework environment 100 in FIG. 1 is not meant to imply limitations to the manner in which other rework environments may be implemented. For example, rework environment 100 may be performed on platforms other than aircraft 102. For example, rework environment 100 may perform a rework on composite structures in other platforms, such as a building, a surface ship, a spacecraft, or some other suitable type of platform.

As another example, other types of mechanisms may be used to cut layer of composite material 142. For example, a physical blade may be used in place of or in addition to laser 140 in ply cutting system 138. The blade also may include ultrasonic excitation.

Figure 2:
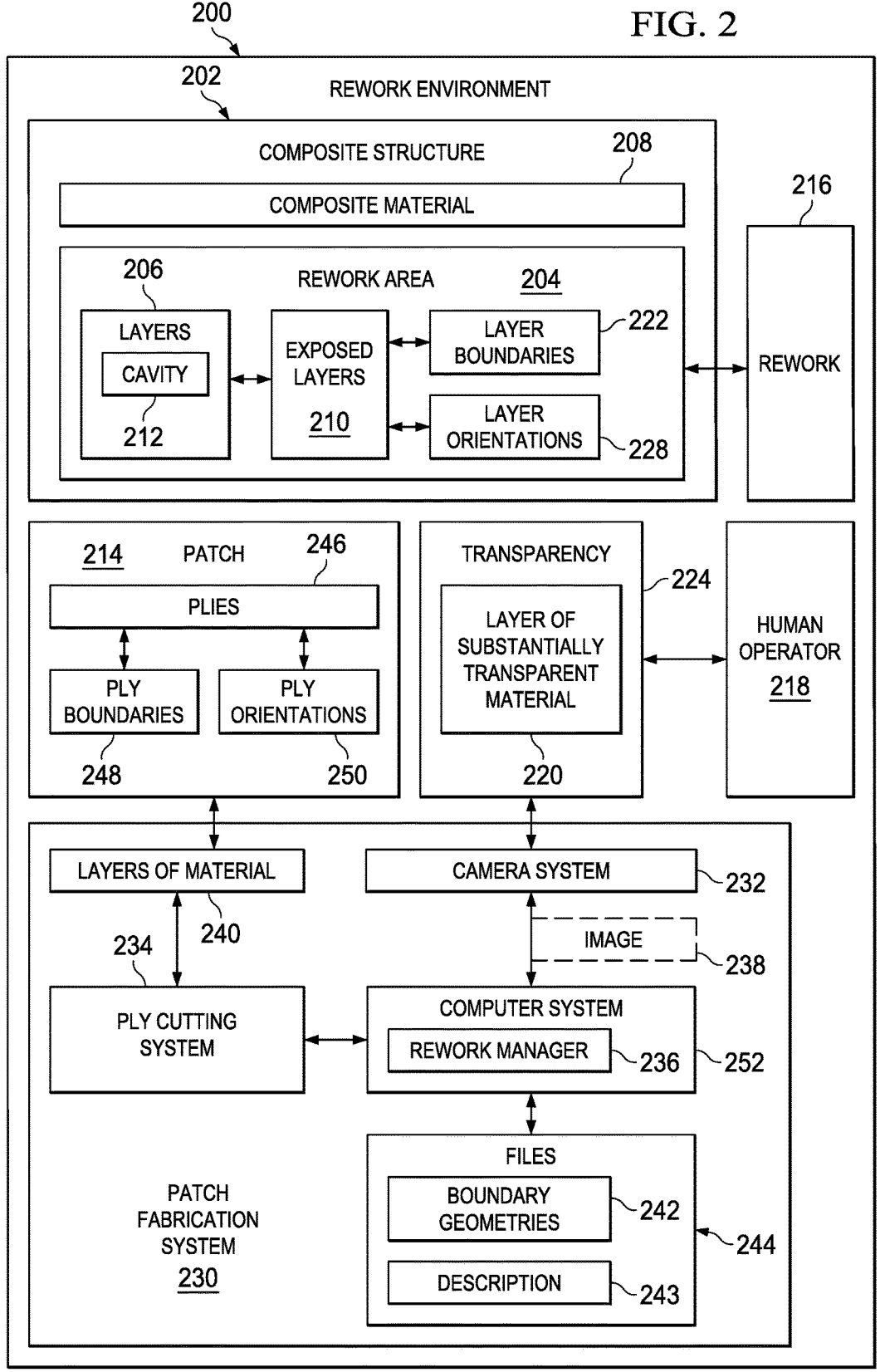
FIG. 2 is an illustration of a block diagram of a rework environment in accordance with an illustrative embodiment.

With reference next to FIG. 2, an illustration of a block diagram of a rework environment is depicted in accordance with an illustrative embodiment. Rework environment 100 in FIG. 1 is a pictorial illustration of one manner in which rework environment 200 in FIG. 2 may be implemented.

In this illustrative example, rework environment 200 includes composite structure 202. Composite structure 202 may take various forms. For example, rework environment 100 in FIG. 1 may be used to perform rework on a composite structure selected from one of a mobile platform, a stationary platform, a land-based structure, an aquatic-based structure, a space-based structure, an aircraft, an unmanned aerial vehicle, a surface ship, a tank, a personnel carrier, a train, a spacecraft, a space station, a satellite, a submarine, an automobile, an aircraft wing, an engine housing, a vertical stabilizer, a fairing, a fuselage, a door, a hatch, a flap, a skin panel, or some other suitable structure in which composite materials may be used.

As depicted, composite structure 202 has rework area 204. Composite structure 202 includes layers 206 of composite material 208. Composite material 208 in this depicted example may include fiber reinforced polymers (FRPs). Fiber reinforced polymers may include carbon fiber reinforced polymers (CFRPs), glass fiber reinforced plastic (GFRP), or other suitable types of fiber reinforced polymers.

A group of layers 206 of composite material 208 has been removed in rework area 204. This removal may be performed to remove an inconsistency. The removal of the group of layers 206 leaves a group of exposed layers 210, thus defining cavity 212 in layers 206 in composite material 208.

In this illustrative example, patch 214 is fabricated in performing rework 216 in rework area 204. In this illustrative example, patch 214 is a composite patch that may be bonded or otherwise attached to composite structure 202 within cavity 212 in rework area 204.

For example, patch 214 is fabricated to fill in cavity 212 left by removing a group of layers 206 of composite material 208. Patch 214 replaces the group of layers 206 in composite material 208 that were removed.

In fabricating patch 214, human operator 218 places layer of substantially transparent material 220 over cavity 212 in rework area 204. Layer of substantially transparent material 220 may be a sheet or other suitable form through which the group of exposed layers 210 may be seen by human operator 218.

As depicted, human operator 218 traces a group of layer boundaries 222 for a group of exposed layers 210 in rework area 204 of composite structure 202. As depicted, the group of layer boundaries 222 for the group of exposed layers 210 is traced on layer of substantially transparent material 220. In the illustrative example, the number of exposed layers 210 that may be traced may be all or some of exposed layers 210. The tracing of the group of layer boundaries 222 for the group of exposed layers 210 on layer of substantially transparent material 220 forms transparency 224.

In this illustrative example, transparency 224 may be processed by patch fabrication system 230 to fabricate patch 214. As depicted, patch fabrication system 230 includes camera system 232, ply cutting system 234, and rework manager 236.

Camera system 232 is a physical hardware system. As depicted, camera system 232 includes one or more cameras that are configured to generate image 238.

In this illustrative example, ply cutting system 234 is a physical hardware system. Ply cutting system 234 is configured to cut layers of material 240. For example, ply cutting system 234 may utilize a laser to cut layers of material 240. Each layer in layers of material 240 may be a carbon fiber fabric that may be dry, prepreg, or some combination thereof.

In this illustrative example, rework manager 236 controls the operation of components in patch fabrication system 230. For example, rework manager 236 controls the operation of at least one of camera system 232 or ply cutting system 234.

As depicted, rework manager 236 controls camera system 232 to generate image 238 of rework area 204 for composite structure 202. Image 238 includes a group of layer boundaries 222 for a group of exposed layers 210 in rework area 204 of composite structure 202.

In this illustrative example, rework manager 236 uses camera system 232 to generate image 238 for rework area 204 by generating image 238 of rework area 204 for composite structure 202 from transparency 224 of rework area 204. Transparency 224 includes the group of layer boundaries 222 for the group of exposed layers 210. Rework manager 236 identifies a group of boundary geometries 242 for the group of layer boundaries 222 for the group of exposed layers 210 in image 238, and identifies a group of layer orientations 228 for the group of exposed layers 210 in rework area 204.

Additionally, rework manager 236 generates description 243 of patch 214 for installation in rework area 204 using the group of boundary geometries 242 for the group of layer boundaries 222 and the group of layer orientations 228. As depicted, patch 214 has a group of plies 246 having a group of ply boundaries 248 with the group of boundary geometries 242 corresponding to the group of layer boundaries 222 and a group of ply orientations 250 corresponding to the group of layer orientations 228.

In this illustrative example, description 243 may be saved in a data structure. As depicted, description 243 may be located in a group of files 244.

Rework manager 236 controls operation of ply cutting system 234 using the group of files 244 describing patch 214 having the group of plies 246 having the group of ply boundaries 248 with the group of boundary geometries 242 corresponding to the group of layer boundaries 222 and the group of ply orientations 250 corresponding to the group of layer orientations 228. As a result, fabricating patch 214 for rework area 204 using the group of files 244 describing patch 214 is enabled.

Rework manager 236 may be implemented in software, hardware, firmware, or a combination thereof. When software is used, the operations performed by rework manager 236 may be implemented in program code configured to run on hardware, such as a processor unit. When firmware is used, the operations performed by rework manager 236 may be implemented in program code and data and stored in persistent memory to run on a processor unit. When hardware is employed, the hardware may include circuits that operate to perform the operations in rework manager 236.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, rework manager 236 is located in computer system 252, which is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In one illustrative example, one or more technical solutions are present that overcome a technical problem with fabricating patches in a manner that reduces copying and cutting errors. As a result, one or more technical solutions may provide a technical effect in which patches are fabricated with a desired fit in rework areas. As a result, the time and expense for reworking an area on a composite structure may be reduced. Further, instances in which a composite structure may be discarded and a new composite structure is fabricated also may be reduced through the ability to fabricate patches with less error and at a lower cost.

As a result, computer system 252 operates as a special purpose computer system in which rework manager 236 in computer system 252 enables identifying boundary geometries 242 from image 238 of transparency 224 and creating one or more of files 244 that are used to control operation of ply cutting system 234 to cut the group of plies 246 to form patch 214. In particular, rework manager 236 turns computer system 252 into a special purpose computer system as compared to currently available general computer systems that do not have rework manager 236.

Figure 3:
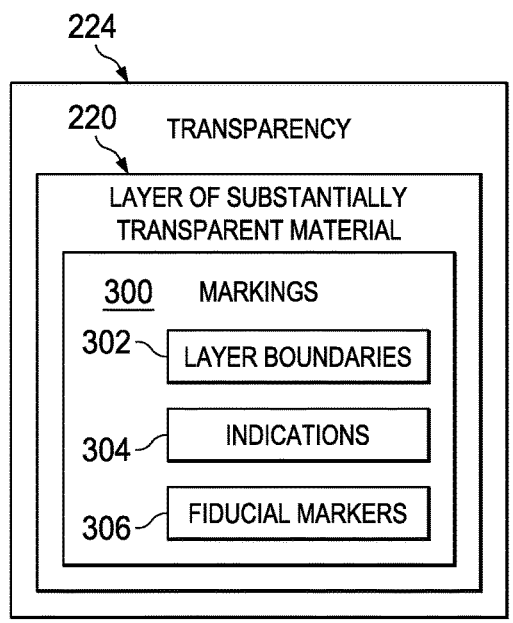
FIG. 3 is an illustration of a block diagram of a transparency in accordance with an illustrative embodiment.

With reference next to FIG. 3, an illustration of a block diagram of a transparency is depicted in accordance with an illustrative embodiment. In the illustrative examples, the same reference numeral may be used in more than one figure. This reuse of a reference numeral in different figures represents the same element in the different figures.

In this illustrative example, transparency 224 comprises layer of substantially transparent material 220 with markings 300. As depicted, human operator 218 in FIG. 2 may mark on layer of substantially transparent material 220 to create markings 300 that form transparency 224. Markings 300 may be made by human operator 218 using an ink pen, a maker, a wax pencil, or some other suitable type of device.

Markings 300 include a number of different types of information. In this example, markings 300 include a group of layer boundaries 302 and a group of indications 304. The group of layer boundaries 302 and markings 300 are formed on layer of substantially transparent material 220 by human operator 218 tracing layer boundaries 302 for exposed layers 210 in FIG. 2 to form the group of layer boundaries 302 on layer of substantially transparent material 220.

In this illustrative example, human operator 218 may also mark a group of indications 304 for a group of layer orientations 228 in FIG. 2 for the group of exposed layers 210 on layer of substantially transparent material 220. In this manner, transparency 224 includes the group of indications 304 for a group of layer orientations 228 for the group of exposed layers 210. In this illustrative example, group of indications 304 for the group of layer orientations 228 are selected from at least one of a color, a line, a shape, a number indicating an angle, or some other suitable indication of layer orientations 228.

Markings 300 may also include a group of fiducial markers 306 on layer of substantially transparent material 220. Alternatively, the group of fiducial markers 306 may be placed on, placed next to, attached to, or otherwise associated with layer of substantially transparent material 220 such that the group of fiducial markers 306 is in image 238 in FIG. 2 when image 238 is generated using camera system 232 in FIG. 2. A fiducial marker is an object or marking that allows camera system 232 to create image 238 with one or more points for reference, measure, or some combination thereof.

The group of fiducial markers 306 indicates a point of reference used to identify a group of boundary geometries 242 for the group of plies 246 in FIG. 2. The group of fiducial markers 306 may be used to identify appropriate measurements and other information for the group of boundary geometries 242.

The group of fiducial markers 306 may be implemented using any type of fiducial marking element or system that allows identification of at least one of dimensions or measurements for boundary geometries 242 of layer boundaries 222 with a desired level of accuracy to fabricate patch 214 of FIG. 2. In the illustrative example, the group of fiducial markers 306 may be selected from at least one of a ruler, a sticker, a stamp, a bar, a pattern, or some other suitable type of marker.

The illustration of rework environment 200 and the different components shown in block form in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, composite structure 202 may also include other materials such as a honeycomb structure, a filler, a noodle, or other suitable materials. With a honeycomb structure, the layers of composite material may sandwich the honeycomb structure. The rework may be performed to replace the layers of composite material that contain inconsistency. In some cases, additional operations may be performed to replace or rework a portion of the honeycomb structure.

Figure 4:
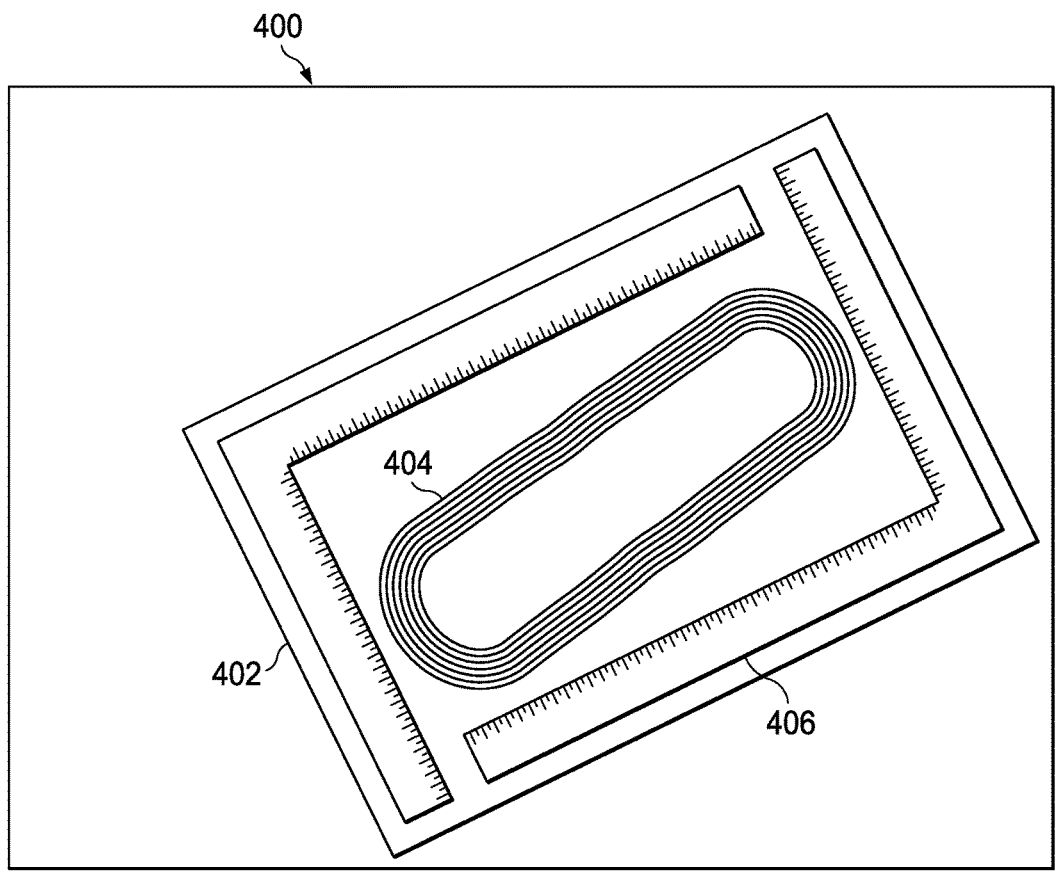
FIG. 4 is an illustration of an image of a transparency in accordance with an illustrative embodiment.

With reference next to FIGS. 4-9, an illustration of a process for generating a patch is depicted. With reference first to FIG. 4, an illustration of an image of a transparency is depicted in accordance with an illustrative embodiment. In this depicted example, image 400 includes transparency 402. Transparency 402 is an example of one implementation for transparency 224, as shown in block form in FIG. 2 and in FIG. 3.

In this illustrative example, transparency 402 includes markings 404 for layer boundaries. Also, fiducial marking 406 is present in image 400. Fiducial marking 406 is used to identify the scale for boundary geometries for plies. In other words, fiducial marking 406 allows for the correct sizing of the boundary geometries.

Figure 5:
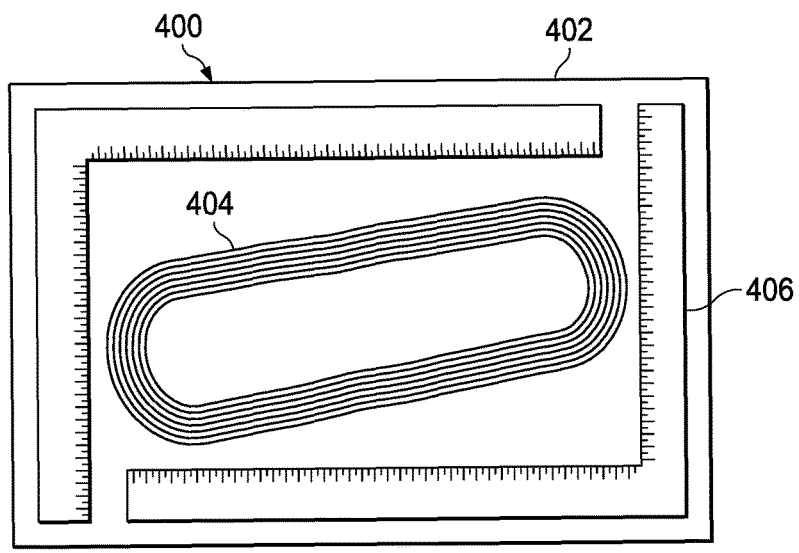
FIG. 5 is an illustration of a processed image in accordance with an illustrative embodiment.

With reference now to FIG. 5, an illustration of a processed image is depicted in accordance with an illustrative embodiment. In this example, image 400 has been rectified and scaled.

Figure 6:
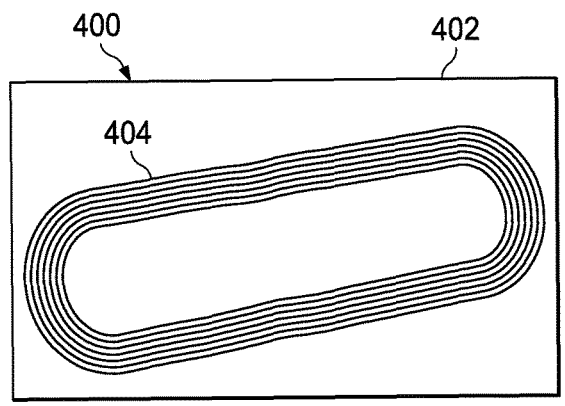
FIG. 6 is an illustration of a processed image in accordance with an illustrative embodiment.

In FIG. 6, an illustration of a processed image is depicted in accordance with an illustrative embodiment. In this example, image 400 has been cropped to remove fiducial marking 406. With a desired scaling of image 400, fiducial marking 406 is not needed. In some examples, fiducial marking 406 may remain in image 400.

Figure 7:
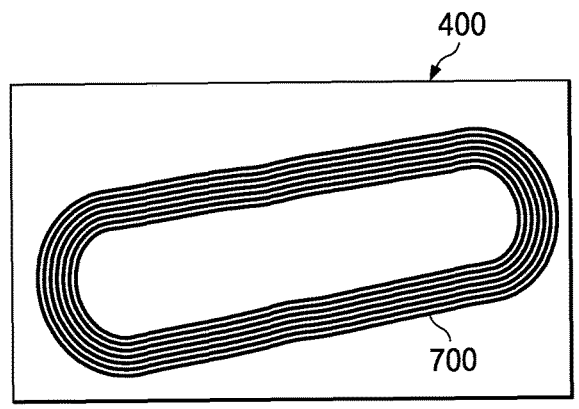
FIG. 7 is an illustration of detected boundaries in accordance with an illustrative embodiment.

Turning now to FIG. 7, an illustration of detected boundaries is depicted in accordance with an illustrative embodiment. In this example, boundaries 700 are detected from markings 404 in image 400. The detection of boundaries 700 in image 400 may be performed using pattern recognition for other suitable types of image processing techniques.

Figure 8:
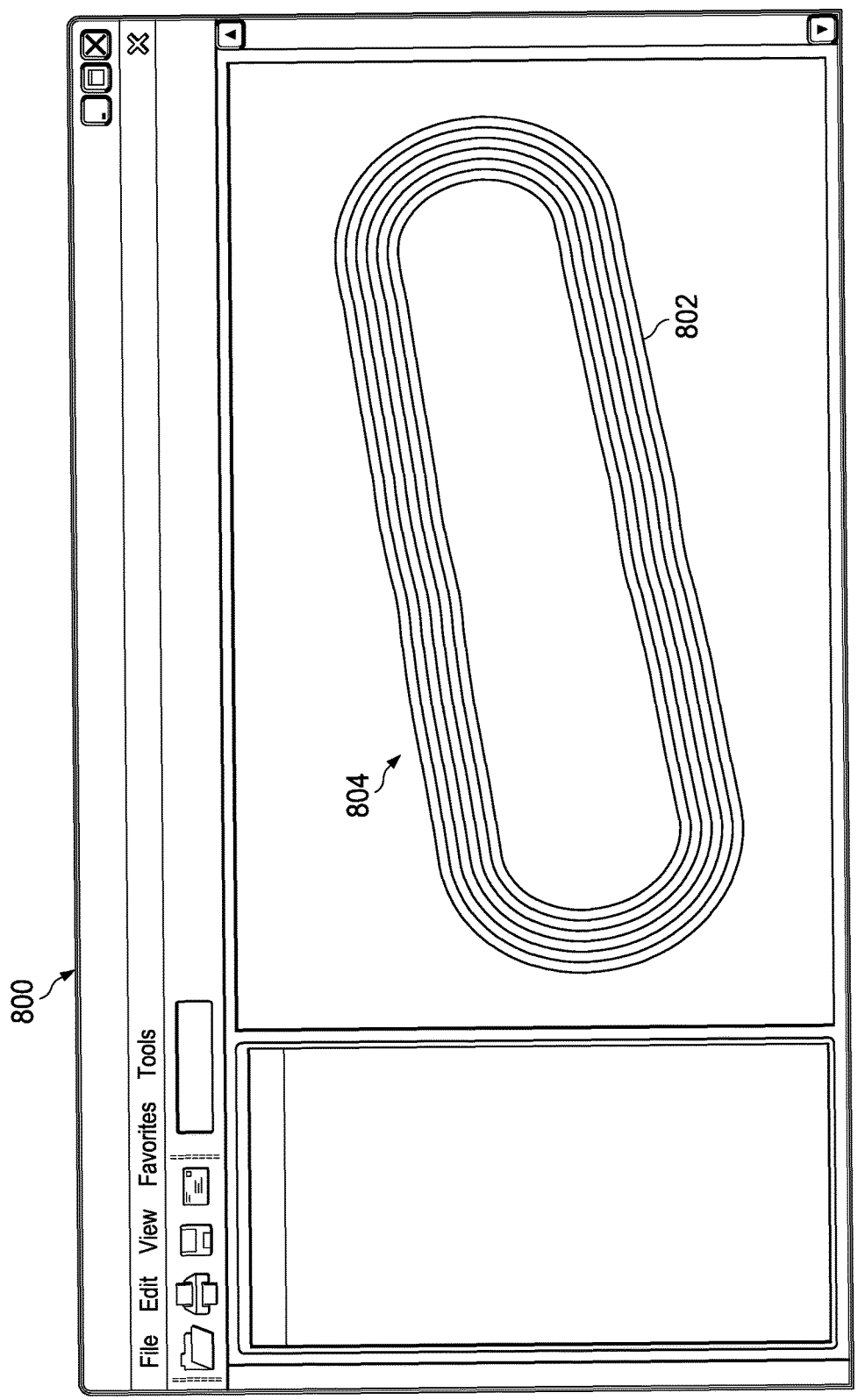
FIG. 8 is an illustration of a file of plies in a patch in accordance with an illustrative embodiment.

With reference now to FIG. 8, an illustration of a file of plies in a patch is depicted in accordance with an illustrative embodiment. In this illustrative example, window 800 shows a visualization of boundary geometries 802 for ply boundaries 804. As depicted, ply boundaries 804 are generated from markings that boundaries 700 identified in FIG. 7.

The file containing boundary geometries 802 may be used in controlling a ply cutting system to cut plies to form a patch that may fill a cavity, such as a scarf in a composite structure. In this illustrative example, the file also may include ply orientations (not shown).

Figure 9:
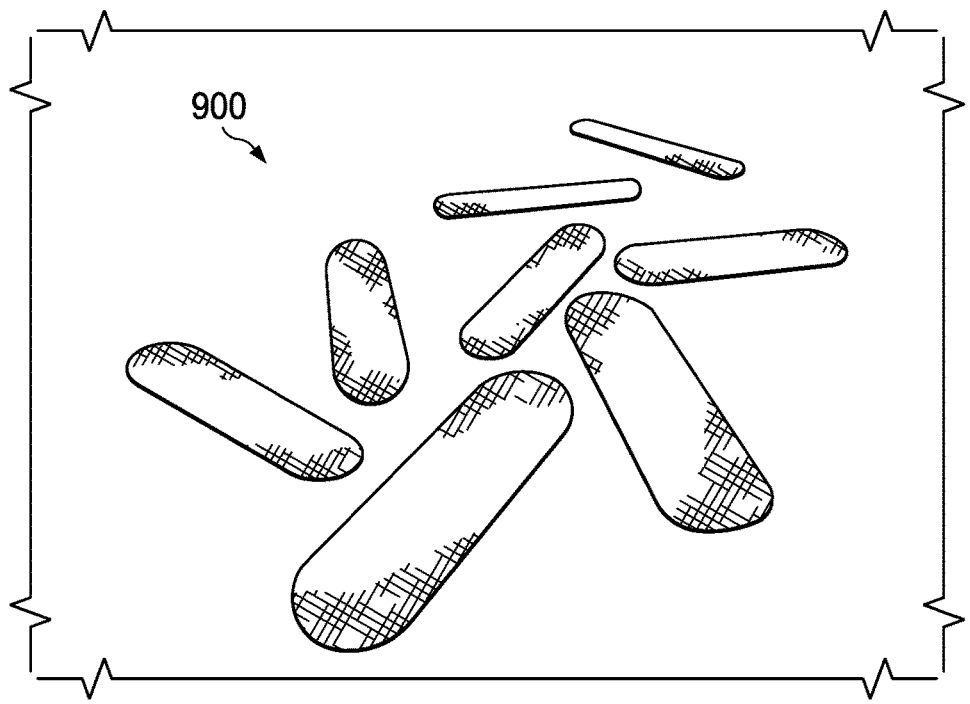
FIG. 9 is an illustration of plies cut from a layer of composite material in accordance with an illustrative embodiment.

With reference to FIG. 9, an illustration of plies cut from a layer of composite material is depicted in accordance with an illustrative embodiment. In this illustrative example, plies 900 are shown after being cut from a layer of composite material. In this example, these plies may be comprised of carbon fiber material. Plies 900 may be dry or prepreg depending on the particular implementation.

As depicted, the layer of composite material has been removed after cutting has occurred, leaving plies 900. As shown, plies 900 have orientations that correspond to the layers of composite material that have been removed from a rework area on a composite structure.

Figure 10:
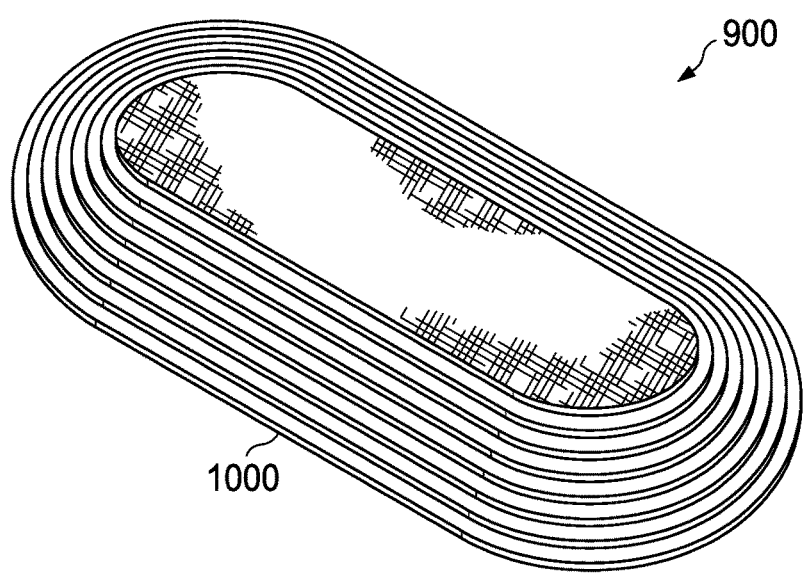
FIG. 10 is an illustration of a patch in accordance with an illustrative embodiment.

With reference now to FIG. 10, an illustration of a patch is depicted in accordance with an illustrative embodiment. In this illustrative example, plies 900 have been stacked to form patch 1000. Patch 1000 may be installed to replace layers of composite material removed from a composite structure.

The illustration of the images, file, plies, and patch in FIGS. 4-14 are provided as an example of one implementation for forming patch 214 shown in block form in FIG. 2. These figures, however, are not meant to limit the manner in which the other illustrative examples may be implemented. For example, plies 900 for patch 1000 is shown as having an elongated oval or racetrack shape. In other illustrative examples, other shapes may be present for plies 900. For example, the shape of the plies may be selected from at least one of a square, a rectangle, a rounded rectangle, an irregular form, a circle, or some other suitable shape. Further, in some examples, fiducial marking 406 may remain in image 400.

Figure 11A:
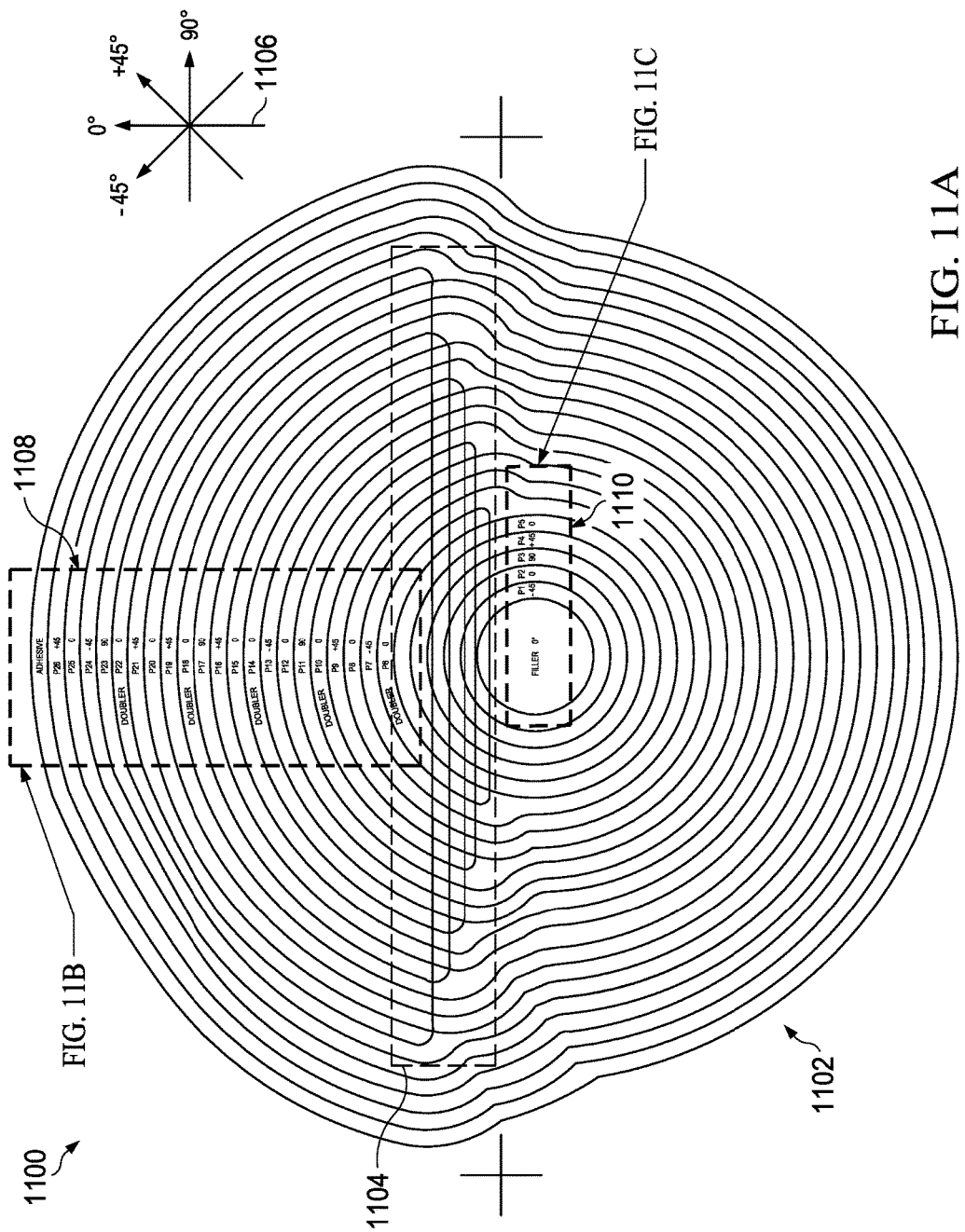
FIGS. 11A, 11B, and 11C are illustrations of a transparency with ply drops in accordance with an illustrative embodiment.
Figure 11B:
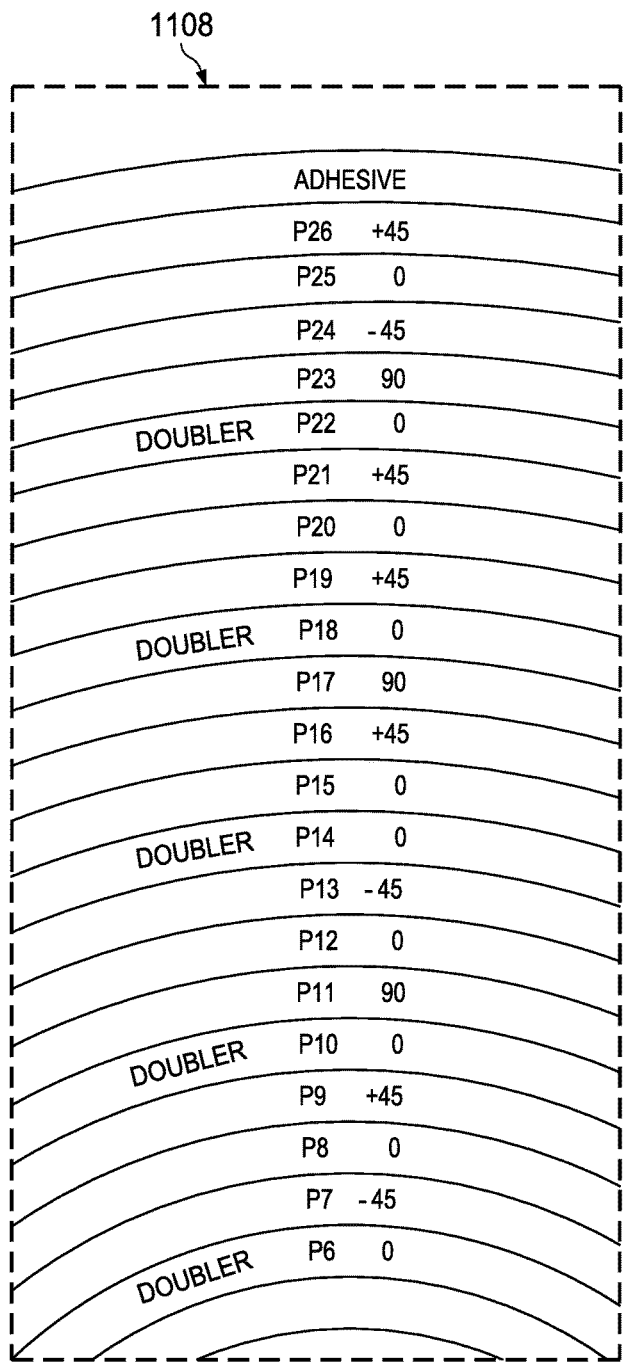
Figure 11C:
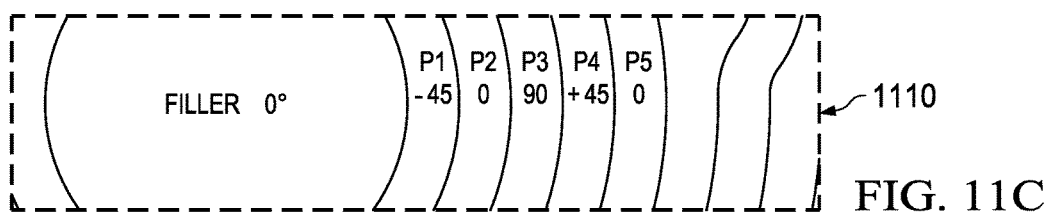

With reference now to FIGS. 11A, 11B, and 11C, illustrations of a transparency with ply drops is depicted in accordance with an illustrative embodiment. Transparency 1100 is an example of one implementation for transparency 224 shown in block form in FIG. 2 and in FIG. 3.

In this illustrative example, transparency 1100 includes markings in the form of layer boundaries 1102 that have been traced from exposed boundaries in a scarf. As depicted in this example, transparency 1100 shows ply drops in section 1104. Additionally, transparency 1100 also includes indications of layer orientations. For example, compass 1106 shows the direction of 0 degrees for the layers. Additionally, layer orientations are also shown in section 1108 and section 1110.

These layer orientations are annotations made by a human operator during or after tracing layer boundaries 1102 on transparency 1100. Further, section 1108 and section 1110 in transparency 1100 also include an indication of the order for the plies as marked by a human operator.

In this illustrative example, an image may be made of transparency 1100. The ply drops may be identified through a user input, a heuristic technique, or some other suitable technique.

The illustration of transparency 1100 in FIG. 11A is only an example of one implementation for transparency 224 in FIG. 2 and in FIG. 3 and not meant to limit the manner in which transparencies may be generated in different illustrative examples. In other illustrative examples, ply drops may be absent from the transparency. As another example, ply drops may be annotated in the transparency.

In still another illustrative example, at least one of color, angle marks, or other symbols may be used in addition to the numbers indicating angles used to indicate ply orientations in section 1108 and section 1110. In other illustrative examples, stickers, stamps, or other techniques may be used to indicate layer orientations.

Figure 12:
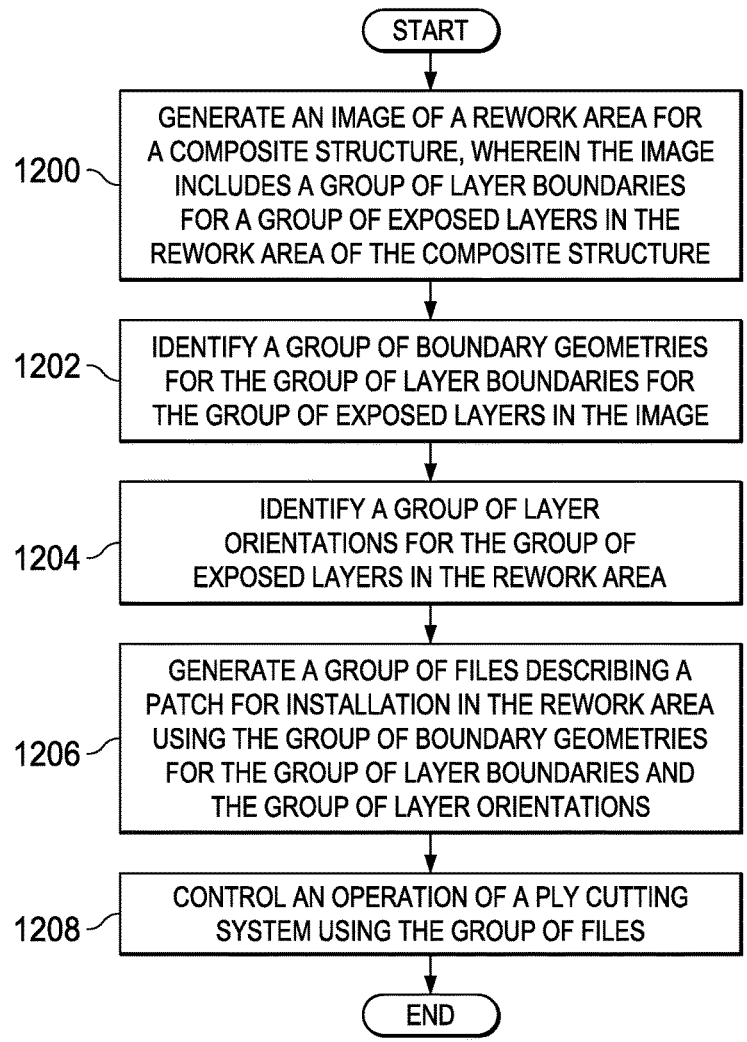
FIG. 12 is an illustration of a flowchart of a process for managing a rework of a composite structure in accordance with an illustrative embodiment.

Turning next to FIG. 12, an illustration of a flowchart of a process for managing a rework of a composite structure is depicted in accordance with an illustrative embodiment. The process illustrated in FIG. 12 may be implemented in rework environment 200 shown in block form in FIG. 2. One or more of the operations may be implemented using patch fabrication system 230 that is controlled by rework manager 236 in FIG. 2.

The process begins by generating an image of a rework area for a composite structure, wherein the image includes a group of layer boundaries for a group of exposed layers in the rework area of the composite structure (operation 1200). In operation 1200, the process may generate the image of the rework area for the composite structure from a transparency of the rework area in which the transparency includes the group of layer boundaries for the group of the exposed layers and a group of indications for the group of layer orientations for the group of exposed layers. The image includes the group of layer boundaries for a group of exposed layers in the rework area of the composite structure and a group of indications for the group of layer orientations for the group of exposed layers. In another illustrative example, the image may be generated by the camera system taking a picture of the rework area. The process identifies a group of boundary geometries for the group of layer boundaries in the image (operation 1202).

The process also identifies a group of layer orientations for the group of exposed layers in the rework area (operation 1204). In operation 1204, the process may identify a group of layer orientations for the group of exposed layers in the rework area from at least one of a group of layer indications for the group of layer orientations in the image, a user input, or a computer aided design model of the composite structure.

The process generates a group of files describing a patch for installation in the rework area using the group of boundary geometries and the group of layer orientations (operation 1206). The patch has a group of plies having a group of ply boundaries with the group of boundary geometries corresponding to the group of layer boundaries and a group of ply orientations corresponding to the group of layer orientations.

The process controls an operation of a ply cutting system using the group of files (operation 1208) with the process terminating thereafter. The group of files describes the patch having the group of plies having the group of ply boundaries with the group of boundary geometries corresponding to the group of layer boundaries and the group of ply orientations corresponding to the group of layer orientations. The group of files enables fabricating the patch for the rework area.

In this illustrative example, the group of files may be a single file when only a single ply is created or when all of the plies for the patch are stored in the same file. In another illustrative example, a file is created for each ply that is to be cut to form the patch.

Thereafter, operations may be performed to install the fabricated patch using the process in FIG. 12. For example, installation of the patch may be performed by a human operator, a machine, a robot that is autonomous or semiautonomous, or some combination thereof. Further, operation 1208 may be performed to create plies for copies of the patch. In this manner, testing of a first copy of the patch prior to the bonding of the second copy of the patch in the rework area may be performed. For example, the first copy of the patch may be used in a thermal survey process to ensure that the patch will correctly fit a scarf in the rework.

Figure 13:
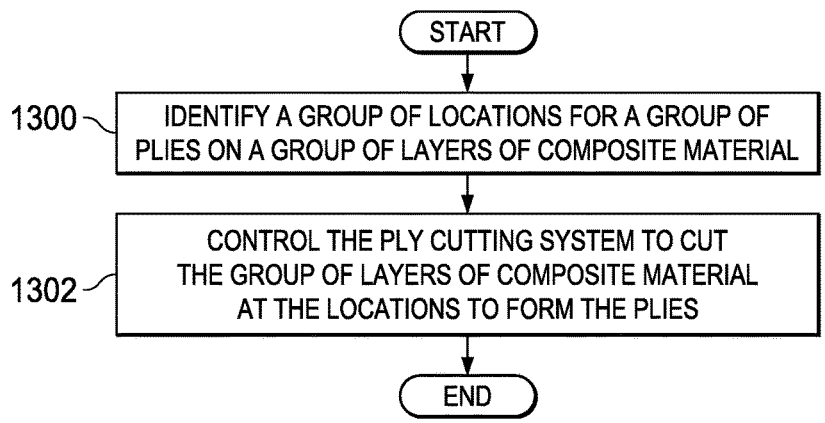
FIG. 13 is an illustration of a flowchart of a process for fabricating a patch in accordance with an illustrative embodiment.

With reference next to FIG. 13, an illustration of a flowchart of a process for fabricating a patch is depicted in accordance with an illustrative embodiment. The process illustrated in FIG. 13 may be implemented in patch fabrication system 230 in FIG. 2. In particular, the process may be implemented by rework manager 236 controlling ply cutting system 234 in FIG. 2. This process may be performed after a group of files is created for the patch.

The process begins by identifying a group of locations for a group of plies on a group of layers of material (operation 1300). Further, in operation 1300, the group of locations for the group of plies may be identified such that a sufficient number of plies are present to form one or more copies of the patch. In this illustrative example, the group of locations may be on a single layer of composite material or more than one layer of composite material.

In operation 1300, a group of additional locations for a group of additional plies may be on the group of layers of composite material with the locations of the plies. The group of additional plies may be for a second copy of the patch, another patch, a new composite structure, or some other purpose.

The process controls the ply cutting system to cut the group of layers of composite material at the locations to form the plies (operation 1302) with the process terminating thereafter. When more than one copy of the patch is desired, the operation of the ply cutting system in operation 1302 may be controlled to create the plurality of copies of the patch using the group of files describing the patch having the group of plies having the group of ply boundaries with the group of boundary geometries corresponding to the group of layer boundaries and the group of ply orientations corresponding to the group of layer orientations.

Figure 14:
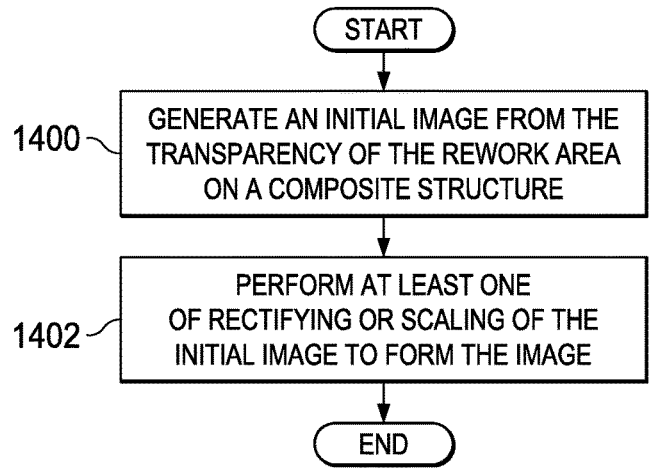
FIG. 14 is an illustration of a flowchart of a process for generating an image from a transparency in accordance with an illustrative embodiment.

With reference next to FIG. 14, an illustration of a flowchart of a process for generating an image from a transparency is depicted in accordance with an illustrative embodiment. The process illustrated in FIG. 14 is an example of one implementation for operation 1200 in FIG. 12.

The process begins by generating an initial image from the transparency of the rework area on a composite structure (operation 1400). The process then performs at least one of rectifying or scaling of the initial image to form the image (operation 1402) with the process terminating thereafter.

Figure 15:
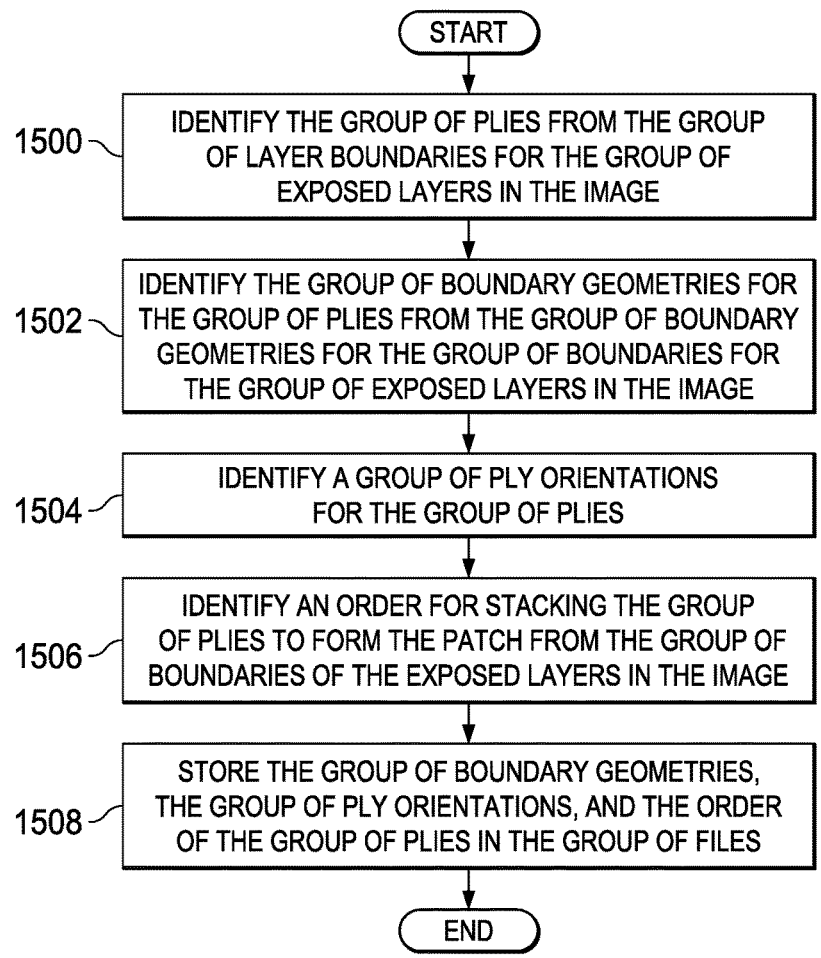
FIG. 15 is an illustration of a flowchart of a process for generating a group of files in accordance with an illustrative embodiment.

With reference now to FIG. 15, an illustration of a flowchart of a process for generating a group of files is depicted in accordance with an illustrative embodiment. The process illustrated in FIG. 15 is an example of one implementation for operation 1206 in FIG. 12.

The process begins by identifying the group of plies from the group of layer boundaries for the group of exposed layers in the image (operation 1500). The process then identifies the group of boundary geometries for the group of plies from the group of boundary geometries for the group of boundaries for the group of exposed layers in the image (operation 1502). The process also identifies a group of ply orientations for the group of plies (operation 1504). In this illustrative example, the orientation may be identified from indications marked on the transparency. In other illustrative examples, other sources such as a computer-aided design (CAD) model of the composite structure, user input, or other sources of information may be used to identify the ply orientations.

The process identifies an order for stacking the group of plies to form the patch from the group of boundaries of the exposed layers in the image (operation 1506). This order may be identified based on the group of layer boundaries. For example, the outermost layer boundary is for a first ply for a first side of the patch, while the innermost layer boundary is for a second ply for a second side of the patch. The first ply for the patch forms the surface of the composite structure, replacing the original ply on the surface of the composite structure. The locations of the intermediate boundaries between those two boundaries are used to identify an order of plies within the stack between the first ply and the second ply.

The process then stores the group of boundary geometries, the group of ply orientations, and the order of the group of plies in the group of files (operation 1508). The group of files may then be used to control a ply cutting system to cut plies for the patch from a layer of composite material with a desired orientation for each ply in the group plies.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 1202 and operation 1204 may be performed at substantially the same time. These operations may be performed by rework manager 236 in FIG. 2 using parallel threads for the operations. In other illustrative examples, operation 1204 may be performed prior to operation 1202.

Figure 16:
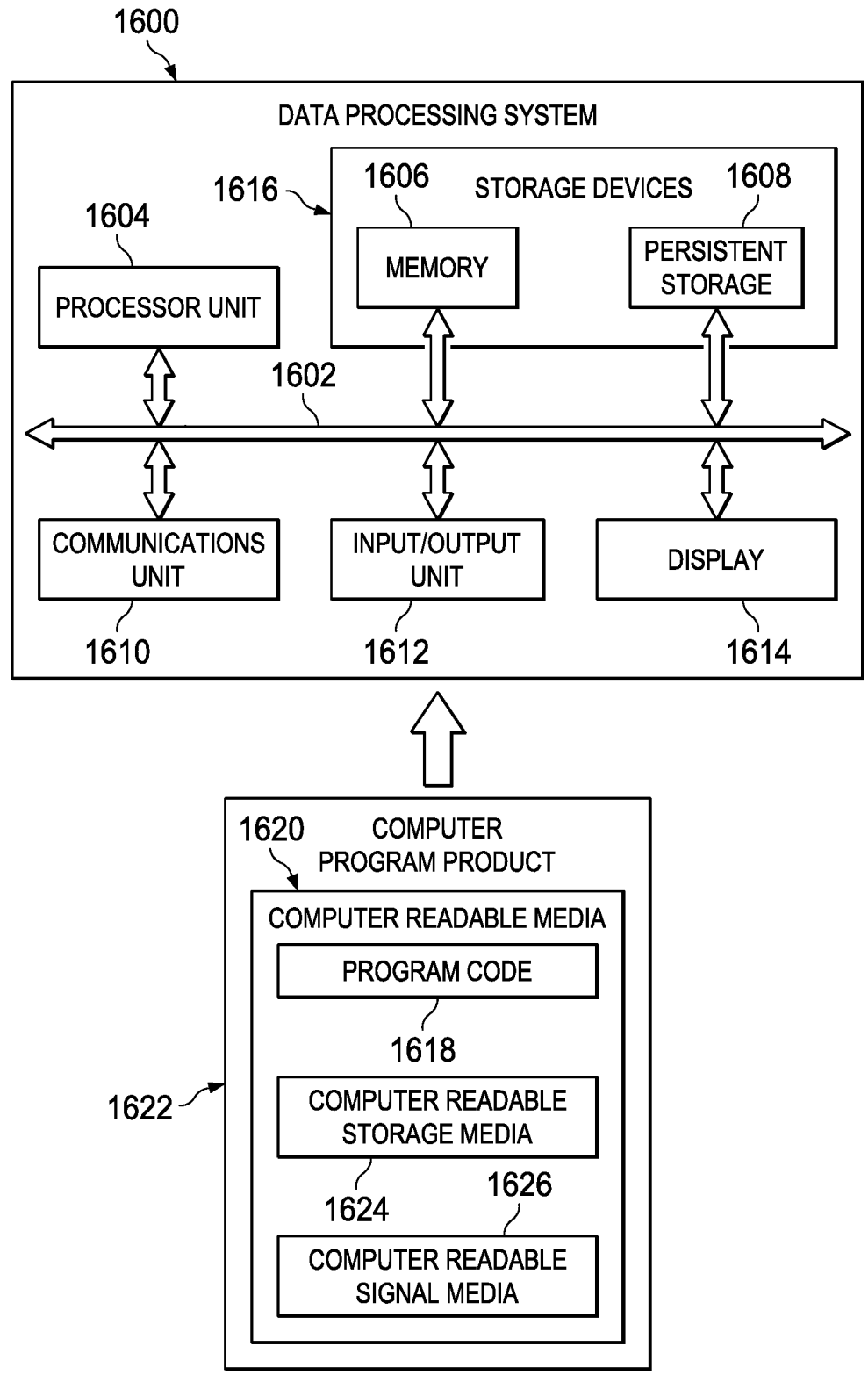
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 may be used to implement computer 136 in FIG. 1 and computer system 252 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 may take the form of a bus system.

Processor unit 1604 serves to execute instructions for software that may be loaded into memory 1606. Processor unit 1604 may be a number of processors, a multi-processor core, or some other type of processor, depending on the particular implementation.

Memory 1606 and persistent storage 1608 are examples of storage devices 1616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1616 may also be referred to as computer readable storage devices in these illustrative examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a solid state hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that may be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs may be located in storage devices 1616, which are in communication with processor unit 1604 through communications framework 1602. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these illustrative examples. In one example, computer readable media 1620 may be computer readable storage media 1624 or computer readable signal media 1626. In these illustrative examples, computer readable storage media 1624 is a physical or tangible storage device used to store program code 1618 rather than a medium that propagates or transmits program code 1618.

Alternatively, program code 1618 may be transferred to data processing system 1600 using computer readable signal media 1626. Computer readable signal media 1626 may be, for example, a propagated data signal containing program code 1618. For example, computer readable signal media 1626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code 1618.

Figure 17:
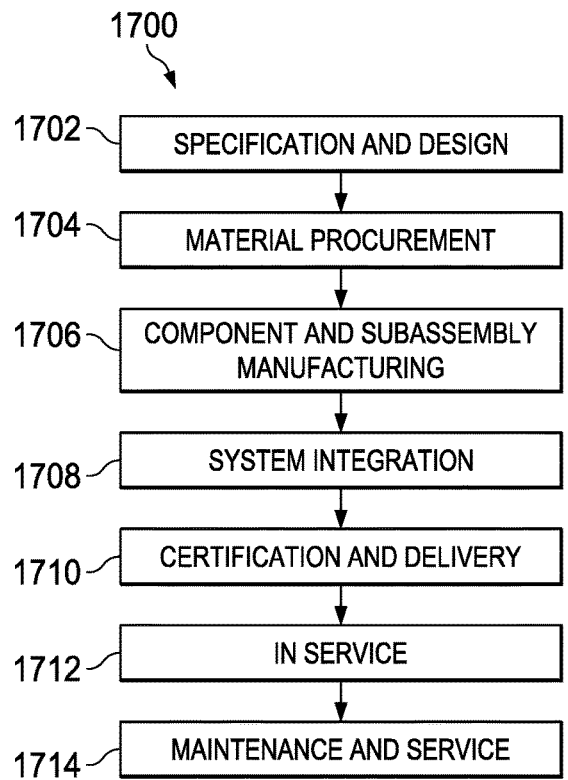
FIG. 17 is an illustration of a block diagram of an aircraft manufacturing and service method in accordance with an illustrative embodiment.
Figure 18:
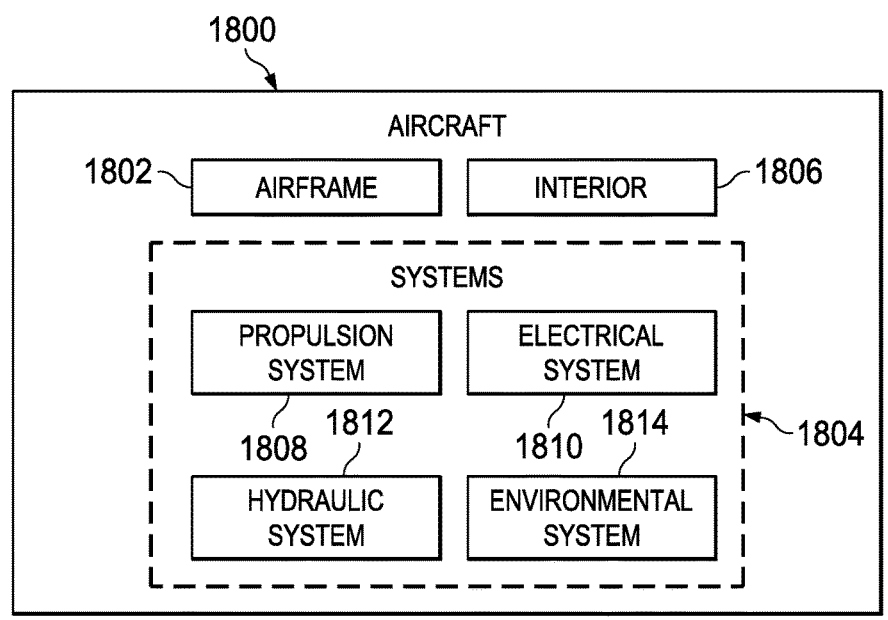
FIG. 18 is an illustration of a block diagram of an aircraft in which an illustrative embodiment may be implemented.

The illustrative embodiments of the present disclosure may be described in the context of aircraft manufacturing and service method 1700, as shown in FIG. 17 and aircraft 1800, as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with a plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 1700 in FIG. 17.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17.

One or more apparatus embodiments, method embodiments, or a combination thereof may be utilized while during component and subassembly manufacturing 1706, maintenance and service 1714, or other stages for aircraft 1800. The use of a number of the different illustrative embodiments may substantially expedite the assembly of aircraft 1800, reduce the cost of aircraft 1800, or both expedite the assembly of aircraft 1800 and reduce the cost of aircraft 1800.

For example, the use of patch fabrication system 230 in FIG. 2 may reduce the time needed to rework composite structures during manufacturing or maintenance. Additionally, the use of patch fabrication system 230 also may increase the opportunity to rework composite structures and reduce the need to discard and replace composite structures.

Figure 19:
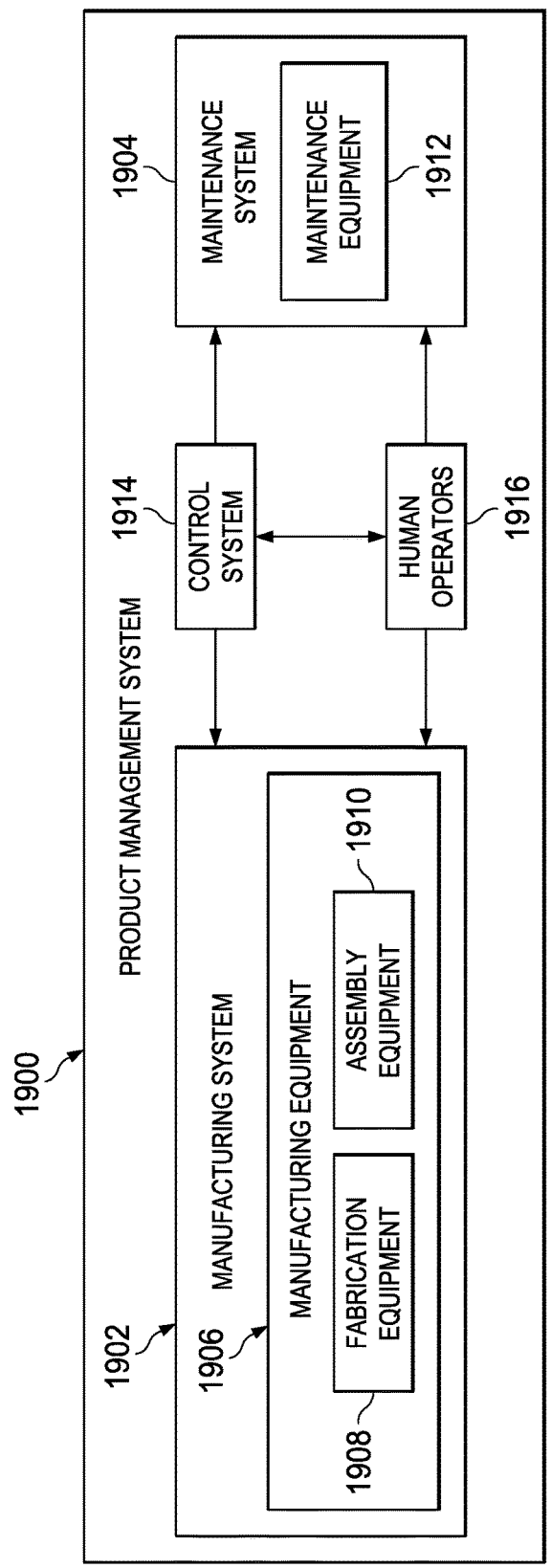
FIG. 19 is an illustration of a block diagram of a product management system in accordance with an illustrative embodiment.

Turning now to FIG. 19, an illustration of a block diagram of a product management system is depicted in accordance with an illustrative embodiment. Product management system 1900 is a physical hardware system. In this illustrative example, product management system 1900 may include at least one of manufacturing system 1902 or maintenance system 1904.

Manufacturing system 1902 is configured to manufacture products, such as aircraft 1800 in FIG. 18. As depicted, manufacturing system 1902 includes manufacturing equipment 1906. Manufacturing equipment 1906 includes at least one of fabrication equipment 1908 or assembly equipment 1910.

Fabrication equipment 1908 is equipment that may be used to fabricate components for parts used to form aircraft 1800. For example, fabrication equipment 1908 may include machines and tools. These machines and tools may be at least one of a drill, a hydraulic press, a furnace, a mold, a composite tape laying machine, a vacuum system, a lathe, a ply cutting system, or other suitable types of equipment. Fabrication equipment 1908 may be used to fabricate at least one of metal parts, composite parts, semiconductors, circuits, fasteners, ribs, skin panels, spars, antennas, patches, or other suitable types of parts.

Assembly equipment 1910 is equipment used to assemble parts to form aircraft 1800. In particular, assembly equipment 1910 may be used to assemble components and parts to form aircraft 1800. Assembly equipment 1910 also may include machines and tools. These machines and tools may be at least one of a robotic arm, a crawler, a faster installation system, a rail-based drilling system, or a robot. Assembly equipment 1910 may be used to assemble parts such as seats, horizontal stabilizers, wings, engines, engine housings, landing gear systems, and other parts for aircraft 1800.

In this illustrative example, maintenance system 1904 includes maintenance equipment 1912. Maintenance equipment 1912 may include any equipment needed to perform maintenance on aircraft 1800. Maintenance equipment 1912 may include tools for performing different operations on parts on aircraft 1800. These operations may include at least one of disassembling parts, refurbishing parts, inspecting parts, reworking parts, manufacturing placement parts, or other operations for performing maintenance on aircraft 1800. These operations may be for routine maintenance, inspections, upgrades, refurbishment, or other types of maintenance operations.

In the illustrative example, maintenance equipment 1912 may include ultrasonic inspection devices, x-ray imaging systems, vision systems, drills, crawlers, ply cutting systems, and other suitable devices. In some cases, maintenance equipment 1912 may include fabrication equipment 1908, assembly equipment 1910, or both to produce and assemble parts such as patches or other parts that may be needed for maintenance.

Product management system 1900 also includes control system 1914. Control system 1914 is a hardware system and may also include software or other types of components. Control system 1914 is configured to control the operation of at least one of manufacturing system 1902 or maintenance system 1904. In particular, control system 1914 may control the operation of at least one of fabrication equipment 1908, assembly equipment 1910, or maintenance equipment 1912.

The hardware in control system 1914 may be using hardware that may include computers, circuits, networks, and other types of equipment. The control may take the form of direct control of manufacturing equipment 1906. For example, robots, computer-controlled machines, and other equipment may be controlled by control system 1914. In other illustrative examples, control system 1914 may manage operations performed by human operators 1916 in manufacturing or performing maintenance on aircraft 1800. For example, control system 1914 may assign tasks, provide instructions, display models, or perform other operations to manage operations performed by human operators 1916. In these illustrative examples, rework manager 236 in FIG. 2 may be implemented in control system 1914 to manage at least one of the manufacturing or maintenance of aircraft 1800 in FIG. 18.

In the different illustrative examples, human operators 1916 may operate or interact with at least one of manufacturing equipment 1906, maintenance equipment 1912, or control system 1914. This interaction may be performed to manufacture aircraft 1800.

Of course, product management system 1900 may be configured to manage other products other than aircraft 1800. Although aircraft management system 1900 has been described with respect to manufacturing in the aerospace industry, aircraft management system 1900 may be configured to manage products for other industries. For example, aircraft management system 1900 may be configured to manufacture products for the automotive industry, as well as any other suitable industries.

For example, one or more illustrative examples reduce error and time that occurs with copying each boundary from a master transparency onto individual transparencies. As a result, this additional step of tracing after the initial tracing that is performed to create the master transparency may be removed. The illustrative examples identify the boundaries for the different plies from an image of the transparency originally created by tracing layer boundaries for exposed layers in a rework area.

As a result, copying and cutting errors from copying boundary layers on a first transparency into multiple transparencies and cutting plies by hand may be reduced. As a result, the patched generated may more accurately fit the cavity in the rework area.

Thus, one or more of the illustrative examples reduce the amount of time needed to create a patch. Additionally, the illustrative examples also reduce copy errors that may occur. In this manner, redoing a rework of a rework area may be reduced or eliminated. With one or more illustrative examples, a patch that restores the original geometry of layers in a composite material may be fabricated and installed into a rework area.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a rework of a composite structure, the method comprising:
    identifying a group of boundary geometries for a group of layer boundaries for a group of exposed layers in a rework area using an image of the rework area for the composite structure, wherein the image includes the group of layer boundaries for the group of exposed layers in the rework area of the composite structure;
    identifying a group of layer orientations for the group of exposed layers in the rework area of the composite structure;
    generating a description of a patch for installation in the rework area using the group of boundary geometries and the group of layer orientations, wherein the patch has a group of plies having a group of ply boundaries with the group of boundary geometries corresponding to the group of layer boundaries and a group of ply orientations corresponding to the group of layer orientations; and
    controlling an operation of a ply cutting system using the description of the patch having the group of plies having the group of ply boundaries with the group of boundary geometries corresponding to the group of layer boundaries and the group of ply orientations corresponding to the group of layer orientations, enabling fabricating the patch for the rework area using the description of the patch.

2. The method of claim 1 further comprising:
    generating the image of the rework area for the composite structure.

3. The method of claim 2, wherein generating the image of the rework area for the composite structure comprises:
    generating the image of the rework area for the composite structure from a transparency of the rework area in which the transparency includes the group of layer boundaries for the group of exposed layers and a group of indications for the group of layer orientations for the group of exposed layers, wherein the image includes the group of layer boundaries for the group of the exposed layers in the rework area of the composite structure and the group of indications for the group of layer orientations for the group of exposed layers.

4. The method of claim 1, wherein identifying the group of layer orientations for the group of exposed layers in the rework area comprises:
    identifying the group of layer orientations for the group of exposed layers in the rework area from at least one of a group of indications for the group of layer orientations in the image, a user input, or a computer aided design model of the composite structure.

5. The method of claim 1 further comprising:
    identifying a group of locations for the group of plies on a group of layers of material, wherein the ply cutting system cuts the group of layers of material at the group of locations to form the group of plies.

6. The method of claim 5, wherein a group of additional locations for a group of additional plies are on the group of layers of material with the group of locations for the group of plies.

7. The method of claim 1, wherein controlling the operation of the ply cutting system comprises:
    controlling the operation of the ply cutting system to create a plurality of copies of the patch using the description of the patch having the group of plies having the group of ply boundaries with the group of boundary geometries corresponding to the group of layer boundaries and the group of ply orientations corresponding to the group of layer orientations.

8. The method of claim 3, wherein generating the image from the transparency of the rework area of the composite structure comprises:
    generating an initial image from the transparency of the rework area of the composite structure; and
    performing at least one of rectifying or scaling of the initial image to form the image.

9. The method of claim 1, wherein generating the description of the patch for installation in the rework area using the group of boundary geometries for the group of layer boundaries and the group of layer orientations comprises:
    identifying the group of plies from the group of layer boundaries for the group of exposed layers in the image;

identifying the group of boundary geometries for the group of plies from group of boundary geometries for the group of layer boundaries for the group of exposed layers in the image; and identifying an order for stacking for the group of plies to form the patch from the group of ply boundaries the group of exposed layers in the image.

10. The method of claim 3, wherein the transparency includes a group of fiducial markers that indicate a point of reference used to identify the group of boundary geometries for the group of plies.

11. The method of claim 3, wherein the group of indications for the group of layer orientations is selected from at least one of a color, a line, a shape, or a number indicating an angle.

12. The method of claim 3 further comprising:
marking the group of layer boundaries for the group of exposed layers and the group of indications for the group of layer orientations for the group of exposed layers on a layer of substantially transparent material to form the transparency of the rework area.

13. The method of claim 1, wherein the composite structure is selected from one of a mobile platform, a stationary platform, a land-based structure, an aquatic-based structure, a space-based structure, an aircraft, an unmanned aerial vehicle, a surface ship, a tank, a personnel carrier, a train, a spacecraft, a space station, a satellite, a submarine, an automobile, an aircraft wing, an engine housing, a vertical stabilizer, a fairing, a fuselage, a door, a hatch, a flap, and a skin panel.

14. An apparatus comprising:
a rework manager that identifies a group of boundary geometries for a group of layer boundaries for a group of exposed layers in a rework area using an image of the rework area for a composite structure, wherein the image includes the group of layer boundaries for the group of exposed layers in the rework area of the composite structure; identifies a group of layer orientations for the group of exposed layers in the rework area; generates a description of a patch for installation in the rework area using the group of boundary geometries and the group of layer orientations, wherein the patch has a group of plies having a group of ply boundaries with the group of boundary geometries corresponding to the group of layer boundaries and a group of ply orientations corresponding to the group of layer orientations; and controls an operation of a ply cutting system using the description of the patch having the group of plies having the group of ply boundaries with the group of boundary geometries corresponding to the group of layer boundaries and the group of ply orientations corresponding to the group of layer orientations, enabling fabricating the patch for the rework area using the description of the patch.

15. The apparatus of claim 14, wherein the rework manager generates the image of the rework area for the composite structure.

16. The apparatus of claim 15, wherein in generating the image of the rework area for the composite structure, the rework manager generates the image of the rework area for the composite structure from a transparency of the rework area in which the transparency includes the group of layer boundaries for the group of exposed layers and a group of indications for the group of layer orientations for the group of exposed layers, wherein the image includes the group of layer boundaries for the group of exposed layers in the rework area of the composite structure and the group of indications for the group of layer orientations for the group of exposed layers.

17. The apparatus of claim 14, wherein in identifying the group of layer orientations for the group of exposed layers in the rework area, the rework manager identifies the group of layer orientations for the group of exposed layers in the rework area from at least one of a group of indications for the group of layer orientations in the image, a user input, or a computer aided design model of the composite structure.

18. The apparatus of claim 14 further comprising:
the ply cutting system in communication with the rework manager, wherein the operation of the ply cutting system is controlled using description of the patch having the group of plies having the group of ply boundaries with the group of boundary geometries corresponding to the group of layer boundaries and the group of ply orientations corresponding to the group of layer orientations.

19. The apparatus of claim 14, wherein the rework manager identifies a group of locations for the group of plies on a group of layers of material, wherein the ply cutting system cuts a layer of material at the group of locations to form the group of plies.

20. The apparatus of claim 19, wherein a group of additional locations for a group of additional plies are on the group of layers of material with the group of locations of the group of plies.

21. The apparatus of claim 18, wherein the rework manager controls the operation of the ply cutting system to create a plurality of copies of the patch using the description of the patch having the group of plies having the group of ply boundaries with the group of boundary geometries corresponding to the group of layer boundaries and the group of ply orientations corresponding to the group of layer orientations.

22. The apparatus of claim 14, wherein generating the description of the patch for installation in the rework area using the group of boundary geometries for the group of layer boundaries and the group of layer orientations, the rework manager identifies the group of plies from the group of layer boundaries for the group of exposed layers in the image; identifies the group of boundary geometries for the group of plies from the group of boundary geometries for the group of boundaries for the group of exposed layers in the image; and identifies an order for stacking for the group of plies to form the patch from the group of boundaries of the group of exposed layers in the image.

23. The apparatus of claim 16, wherein the transparency includes a group of fiducial markers that indicate a point of reference used to identify the group of boundary geometries for the group of plies.

24. The apparatus of claim 14, wherein a group of indications for the group of layer orientations are selected from at least one of a color, a line, a shape, or a number indicating an angle.

25. The apparatus of claim 14, wherein the composite structure is selected from one of a mobile platform, a stationary platform, a land-based structure, an aquatic-based structure, a space-based structure, an aircraft, an unmanned aerial vehicle, a surface ship, a tank, a personnel carrier, a train, a spacecraft, a space station, a satellite, a submarine, an automobile, an aircraft wing, an engine housing, a vertical stabilizer, a fairing, a fuselage, a door, a hatch, a flap, and a skin panel.

26. A patch fabrication system comprising:
a camera system;
a ply cutting system; and
a control system that controls the camera system to generate an image from a transparency of a rework area of a composite structure, wherein the transparency includes layer boundaries of exposed layers in the rework area of the composite structure and indications of layer orientations of the exposed layers; identifies plies from the layer boundaries for the exposed layers in the image; identifies ply orientations for the plies from the indications of the layer orientations for the exposed layers in the image; generates a group of files describing ply boundaries and the ply orientations; and controls an operation of the ply cutting system using an identification of the ply boundaries and the ply orientations in the group of files, wherein a patch for the rework area is fabricated using the group of files describing ply boundaries and the ply orientations.

27. The patch fabrication system of claim 26, wherein the patch fabrication system is located in at least one of a manufacturing system or a maintenance system.

\* \* \* \* \*

UNITED STATES PATENT AND TRADEMARK OFFICE
CERTIFICATE OF CORRECTION

PATENT NO. : 9,827,688 B2
APPLICATION NO. : 14/993283
DATED : November 28, 2017
INVENTOR(S) : Bain et al.

Page 1 of 1

It is certified that error appears in the above-identified patent and that said Letters Patent is hereby corrected as shown below:

In the Claims

Column 21, Line 6, change "boundaries the group" to --boundaries of the group--

Signed and Sealed this
Sixteenth Day of October, 2018

Andrei Iancu
*Director of the United States Patent and Trademark Office*